US005607751A

United States Patent [19]

Sakakibara et al.

[11] Patent Number: 5,607,751

[45] Date of Patent: Mar. 4, 1997

[54] RECORDING MEDIUM, METHOD OF FORMIMG IMAGE USING THE SAME, AND METHOD OF PRODUCING PRINT USING THE SAME

[75] Inventors: Teigo Sakakibara; Naoto Fujimura, both of Yokohama; Kiyoshi Sakai, Hachioji; Hiroshi Aoto, Kawasaki; Shunichiro Nishida, Tokyo, all of Japan

[73] Assignee: Canon Kabushiki Kaisha, Tokyo, Japan

[21] Appl. No.: 323,861

[22] Filed: Oct. 17, 1994

[30] Foreign Application Priority Data

| | | | |
|---|---|---|---|
| Oct. 20, 1993 | [JP] | Japan | 5-262522 |
| Oct. 3, 1994 | [JP] | Japan | 6-238883 |

[51] Int. Cl.$^6$ .......... B32B 3/00

[52] U.S. Cl. .......... 428/195; 428/203; 428/206; 428/411.1; 428/447; 428/451; 428/457; 428/500; 428/688

[58] Field of Search .......... 428/195, 411.1, 428/688, 447, 451, 457, 203, 206, 500

[56] References Cited

U.S. PATENT DOCUMENTS

| | | | |
|---|---|---|---|
| 5,219,928 | 6/1993 | Stofko, Jr. et al. | 525/57 |
| 5,352,736 | 10/1994 | Stofko, Jr. et al. | 525/57 |

FOREIGN PATENT DOCUMENTS

| | | |
|---|---|---|
| 482837 | 4/1992 | European Pat. Off. . |
| 583141 | 2/1994 | European Pat. Off. . |

OTHER PUBLICATIONS

Derwent Database WPI AN 92–295166 with repect to Japanese Patent Document No. 4–201594.

*Primary Examiner*—William Krynski
*Attorney, Agent, or Firm*—Fitzpatrick, Cella, Harper & Scinto

[57] ABSTRACT

Disclosed herein is a recording medium comprising a base material and an ink-receiving layer provided on the base material, wherein the ink-receiving layer comprises a high-water-absorptive material obtained by grafting, on a water-absorptive polymer, an inorganic oxide formed from an inorganic alkoxide represented by the formula $$(R_2)_n\text{—}M\text{—}(OR_1)_{m-n}$$

wherein M denotes an element selected from the group consisting of Si, Al, Ti, Zr, Ca, Fe, V, Sn, Be, B and P, m is a valence of M, n is an integer of 1 or 2, $R_1$ denotes an alkyl group having 1 to 4 carbon atoms which may have a substituent group, and $R_2$ denotes an alkyl group having 1 to 4 carbon atoms or a phenyl group, each of which may have a substituent group.

9 Claims, No Drawings

RECORDING MEDIUM, METHOD OF FORMIMG IMAGE USING THE SAME, AND METHOD OF PRODUCING PRINT USING THE SAME

BACKGROUND OF THE INVENTION

1. Field of the Invention

The present invention relates to a recording medium suitable for use in an ink-jet recording method, a method of forming images using such a recording medium, and a method of producing a print using the recording medium, and more particularly to a recording medium which exhibits excellent ink receptivity, provides recorded images excellent in brightness and prevents the occurrence of curling, a method of forming images using such a recording medium, and a method of producing a print using the recording medium.

2. Related Background Art

An ink-jet recording method is a recording method in which recording is conducted by generating and flying droplets of an ink by one of various ink ejection systems, for example, an electrostatic attraction system, a system using a piezoelectric element to give an ink mechanical vibration or change, or a system in which an ink is heated to form bubbles in the ink, thereby using the pressure thus produced, and applying the droplets in whole or in part to a recording medium such as paper. The ink-jet recording method attracts attention as a printing method which scarcely produces noise and can conduct high-speed printing and multi-color printing.

As inks for ink-jet recording, inks comprising water as a principal component are mainly used from the viewpoint of safety and recordability. Polyhydric alcohols and/or the like are often added to such inks with a view toward preventing the clogging of nozzle and improving ejection stability.

As recording media used in this ink-jet recording method, there have heretofore been used ordinary plain paper and recording media called ink-jet recording paper in which a porous ink-receiving layer is provided on a base material.

With the improvement in performance of ink-jet recording apparatus, such as speeding up of recording and multi-coloring of images, and the spread of such ink-jet recording apparatus, recording media are also being required to have higher and wider properties. More specifically, in order to obtain recorded images high in resolution and quality, the recording media for ink-jet recording are required to simultaneously satisfy basic requirements, for example, the following properties:

(1) receiving ink therein as quick as possible;
(2) in case ink dots overlap each other, preventing the ink of a dot applied later from running out into a dot applied earlier;
(3) preventing an ink droplet from diffusing thereon to enlarge the diameter of an ink dot beyond its need;
(4) providing dots having a substantially round shape and a smooth periphery; and
(5) providing dots high in optical density (OD) and clear in periphery.

In order to obtain recorded images having high resolution comparable with that of a color photograph by a multi-color ink-jet recording method, the recording media are further required to have, in addition to the above performance requirements, the following performance characteristics:

(6) having excellent coloring ability to the coloring component in an ink;
(7) having far excellent ink-fixing ability because the same number of ink droplets as the number of colors of inks may be applied to the same place over and over again;
(8) having a good surface gloss; and
(9) having a high whiteness.

Although recorded images obtained by the ink-jet recording method have heretofore been exclusively used for the observation of surface images, recording media suitable for uses other than the use for the observation of surface images are being required with the improvement in performance and the spread of the ink-jet recording apparatus. Uses of the recording media other than the use for the observation of surface images include uses for the observation of projected images formed by projecting recorded images on a screen by an optical instrument such as a slide projector or an overhead projector (OHP), a color separation plate upon the preparation of a positive plate for multi-color printing, a color mosaic filter (CMF) used in color displays such as liquid crystals, etc.

In case a recording medium is used for the observation of surface images, the diffused light of the recorded images is mainly observed. On the other hand, the transmitted light of the recorded images mainly becomes a matter of importance in the recording media for the uses other than the observation of surface images. Therefore, such recording media are further required to have excellent light transmission properties, in particular, linear transmittance, in addition to the above requirements of the ordinary recording media for ink-jet recording.

However, there has not been yet known under the circumstances any recording medium which can satisfy all these performance requirements.

Many of the conventional recording media for the observation of surface images have had a porous inorganic ink-receiving layer on their surfaces so as to receive an ink in voids thereof to fix the ink. Such a recording medium has been lusterless because its surface has been porous, and has been required to make the ink-receiving layer somewhat thick for receiving the ink therein. On the other hand, in case a non-porous organic ink-receiving layer (composed of a water-soluble resin) has been provided on the surface, such a recording medium has involved a drawback that since a nonvolatile component such as a polyhydric alcohol in an ink remains in the surface of the recording medium for a long period of time after recording, the drying and fixing time of the ink becomes longer, whereby clothes are smeared when coming into contact with recorded images, or the recorded images are impaired due to the peeling of film and the like.

SUMMARY OF THE INVENTION

It is accordingly an object of the present invention to provide a recording medium which exhibits excellent ink receptivity and provides recorded images excellent in brightness even when a great amount of inks are applied thereto at a time, in particular, as in color recording, and hardly undergoes curling, a method of forming images using such a recording medium, and a method of producing a print using the recording medium.

Another object of the present invention is to provide a recording medium which exhibits excellent ink receptivity, provides recorded images excellent in brightness and surface gloss and is suitable for use in full-color ink-jet recording.

A further object of the present invention is to provide a recording medium which can be used for the observation of transmitted light such as in the observation of projected images formed by projecting recorded images on a screen by an optical instrument such as a slide projector or an OHP, a color separation plate upon the preparation of a positive plate for multi-color printing, a CMF used in color displays such as liquid crystals, etc., and is suitable for use in ink-jet recording The above and other objects can be achieved by the present invention described below.

According to the present invention, there is thus provided a recording medium comprising a base material and an ink-receiving layer provided on the base material, wherein the ink-receiving layer comprises a high-water-absorptive material obtained by grafting, on a water-absorptive polymer, an inorganic oxide formed from an inorganic alkoxide represented by the formula $$(R_2)_n—M—(OR_1)_{m-n}$$

wherein M denotes an element selected from the group consisting of Si, Al, Ti, Zr, Ca, Fe, V, Sn, Be, B and P, m is a valence of M, n is an integer of 1 or 2, $R_1$ denotes an alkyl group having 1 to 4 carbon atoms which may have a substituent group, and $R_2$ denotes an alkyl group having 1 to 4 carbon atoms or a phenyl group, each of which may have a substituent group.

According to the present invention, there is also provided a recording medium comprising a base material and an ink-receiving layer provided on the base material, wherein the ink-receiving layer comprises a high-water-absorptive material obtained by grafting, on a water-absorptive polymer, at least two inorganic oxides formed from inorganic alkoxides represented by the formula $$(R_2)_n—M—(OR_1)_{m-n}$$

wherein M denotes an element selected from the group consisting of Si, Al, Ti, Zr, Ca, Fe, V, Sn, Li, Be, B and P, m is a valence of M, n is an integer of 0, 1 or 2, $R_1$ denotes an alkyl group which may have a substituent group, and $R_2$ denotes an alkyl group or a phenyl group, each of which may have a substituent group.

According to the present invention, there is further provided a method of forming images, which comprises applying droplets of an ink from an orifice to the ink-receiving layer of one of the recording media described above in accordance with a recording signal, thereby conducting image formation.

According to the present invention, there is still further provided a method of producing a print, which comprises applying an ink to one of the recording media described above, thereby conducting printing.

According to the present invention, there is yet still further provided a print obtained by printing images on the ink-receiving layer of one of the recording media described above.

DESCRIPTION OF THE PREFERRED EMBODIMENTS

The present invention will hereinafter be described in detail by the following preferred embodiments.

The high-water-absorptive material used in the preferred embodiments of the present invention has a structure that porous inorganic ultrafine particles obtained by hydrolyzing and polycondensing an alkoxide have been grafted on a (poly)acrylic acid. Since this material contains the porous inorganic ultrafine particles, the specific surface area of the porous structure can be enlarged. Therefore, it is excellent particularly in ink receptivity, and also in water resistance because of its graft structure. Besides, the ink-receiving layer formed of such a material is far excellent in light transmission properties because its porosity is due to the ultrafine particles. Since an inorganic alkoxide has an uncrosslinkable group other than alkoxy groups, it is relatively low in crystallizability. Therefore, the recording medium according to the present invention can satisfy high ink absorptiveness and the prevention of curling at the same time.

The recording media according to the present invention generally comprise a base material as a support and an ink-receiving layer provided on the surface thereof. As examples of particularly preferred embodiments, may be mentioned the following embodiments:

(1) both base material and ink-receiving layer have good light transmission properties, and the recording medium thus has good light transmission properties as a whole; and (2) the surface of the ink-receiving layer is smooth.

The ink-receiving layer of the recording medium according to the present invention serves to receive an ink from a recording means such as a recording apparatus or a recording utensil upon recording.

In general, the reception of an ink by a recording medium is conducted by the penetration of the ink applied to the ink-receiving layer into fine voids within the texture of the ink-receiving layer mainly by dissolving action or swelling action. As factors greatly affecting such ink reception by the ink-receiving layer, may be mentioned the structure of the ink-receiving layer and the physical properties of a material constituting the ink-receiving layer. More specifically, it is important that the ink-receiving layer has a structure that an ink is easy to penetrate, and a void volume suitable for receiving and containing the ink therein, and that the material constituting the ink-receiving layer has a high affinity for the ink. Therefore, when an ink to be used is water-based, it is very effective in providing an excellent ink-receiving layer to use a hydrophilic material as a material constituting a part receiving and containing the ink therein, i.e., an ink-receiving layer.

The ink further contains at least one polyhydric alcohol such as glycerin or diethylene glycol for purposes of the prevention of nozzle clogging, the modification of viscosity, and so on. Therefore, the ink-receiving layer must receive these nonvolatile liquid media at the same time as the reception of water, and is hence required to have a high affinity for these nonvolatile liquid media in addition to the hydrophilicity.

The present inventor has carried out an extensive investigation in view of the various respects as described above. As a result, it has been found that when a material obtained by grafting a compound of a siloxane structure, which is formed from an inorganic alkoxide and has at least one alkoxy group, on a water-absorptive polymer is used as a main material for forming an ink-receiving layer on a base material, a recording medium which satisfies the various conditions as described above, has excellent light transmission properties and gloss and exhibits excellent ink receptivity is obtained.

According to the ink-receiving layer of the recording medium according to the present invention, a continuous film exhibiting excellent ink receptivity even when a great amount of inks are applied thereto at a time as in color recording, and having good light transmission properties can be formed.

The water-absorptive polymer suitable for use in forming the ink-receiving layer according to the present invention is obtained preferably from polyacrylic acid, polymethacrylic acid or a copolymer thereof and a salt obtained by neutralizing polyacrylic acid or polymethacrylic acid with a base.

A detailed description will be given taking the case of polyacrylic acid. At least one base such as a metal hydroxide such as LiOH, NaOH or KOH, or an amine is added in an amount of 0.1 mol or more, preferably 0.3 mol or more per 1 mol of the acrylic acid unit of water-soluble polyacrylic acid to neutralize the acrylic acid unit equivalent to the base, thereby obtaining a water-absorptive polymer. Alternatively, polyacrylic acid and a neutralized salt thereof such as sodium polyacrylate are mixed with each other to obtain a water-absorptive polymer. In this case, both polyacrylic acid and sodium polyacrylate are mixed in such a proportion that the neutralized salt is 0.1 mol or more, preferably 0.3 mol or more per mol of the acrylic acid units of both polymers.

Inorganic alkoxides suitable for use in grafting on the water-absorptive polymer are compounds represented by the formula $(R_2)_n$—M—$(OR_1)_{m-n}$. In the formula, M denotes an element selected from the group consisting of Si, Al, Ti, Zr, Ca, Fe, V, Sn, Be, B and P, m is a valence of M, n is an integer of 0, 1 or 2, $R_1$ denotes an alkyl group having 1 to 4 carbon atoms which may have a substituent group, and $R_2$ denotes an alkyl group having 1 to 4 carbon atoms or a phenyl group, which may have a substituent group.

As particularly preferable examples of such inorganic alkoxides, may be mentioned the following compounds when n is 1 or 2:

$CH_3Si(OCH_3)_3$,
$CH_3Si\ (OC_2H_5)_3$,
$C_6H_5Si\ (OCH_3)_3$,
$C_6H_5Si(OC_2H_5)_3$ and
$(CH_3)_2Si(OCH_3)_2$, and the following compound when n is 0:
$Si(OC_2H_5)_4$ and
$Si(OCH_3)_4$.

The grafting of the water-absorptive polymer is conducted in the following manner. The inorganic alkoxide is hydrolyzed with an acid or the like and then subjected to a polycondensation reaction to form inorganic oxide ultrafine particles (gel of the alkoxide) of a siloxane structure. The ultrafine particles are then reacted with the water-absorptive polymer. As the acid, may be used a mineral acid such as hydrochloric acid, or an organic acid such as acetic acid.

In the present invention, when one kind of the inorganic alkoxide is used, the use of a compound in which n is 1 or 2 is essential. When two or more kinds of the inorganic alkoxides are used in combination, the use of at least one compound in which n is 1 or 2 is preferred.

The ink-receiving layer can be obtained by mixing the water-absorptive polymer with at least one of the inorganic alkoxides. With respect to their mixing ratio, the inorganic alkoxide(s) is used in an amount ranging from 0.03 to 3.0 mol, preferably from 0.1 to 1.0 mol per 1 mol of the acrylic acid units of the polyacrylic acids in the water-absorptive polymer.

As the base material used as a support for the ink-receiving layer in the present invention, may be used either a transparent base material or a opaque base material. Preferable examples of the transparent base material include films or sheets or plates composed of polyester resins, diacetate resins, triacetate resins, acrylic resins, polycarbonate resins, polyvinyl chloride resins, polyimide resins, cellophane, celluloid and the like, and glass sheets or plates. Preferable example of the opaque base material include ordinary plain paper, cloths, wood, metal sheets or plates and synthetic paper, and besides those obtained by opacifying the above-mentioned transparent base materials by any method known per se in the art.

The recording media according to the present invention are prepared by using the main materials as described above. According to the preferred embodiment (1), both base material and ink-receiving layer have good light transmission properties, and the recording medium thus has good light transmission properties as a whole. The recording medium according to this embodiment is far excellent in light transmission properties and is principally used in an OHP and the like in which recorded images are projected on a screen or the like by an optical instrument, and is hence useful as a recording medium used for the observation of transmitted light.

Such a light-transmitting recording medium can be prepared by forming a light-transmitting ink-receiving layer on the light-transmitting base material as described above from a light-transmitting polymer composed of the high-water-absorptive material as described above.

As a process for forming such an ink-receiving layer, it is preferable to use a process in which the high-water-absorptive material alone or a mixture of this material and one or more other polymers is dissolved or dispersed in a proper solvent to prepare a coating formulation, and the coating formulation is applied to the light-transmitting base material by means of the conventionally-known method such as a roll coating method, a rod bar coating method, a spray coating method, a die coating method, a lip coating method or an air knife coating method, and then quickly dried. A process in which the high-water-absorptive material alone or a mixture of this material and one or more other polymers is applied by hot melt coating, or a process a single ink-receiving layer is formed from the material as described above, and the thus-formed sheet is laminated on the base material may be used.

Preferable examples of the other polymers usable in admixture with the high-water-absorptive material in the above-described process include natural resins such as albumin, gelatin, casein, starch, cationic starch, gum arabic and sodium alginate, and synthetic resins such as polyamide, polyacrylamide, polyvinyl pyrrolidone, quaternized polyvinyl pyrrolidone, polyethylene imine, polyvinylpyridinium halides, melamine resins, polyurethane, polyvinyl alcohol, polyester, sodium polyacrylate, SBR latexes, NBR latexes, polyvinyl formal, polymethyl methacrylate, polyvinyl butyral, polyacrylonitrile, polyvinyl chloride, polyvinyl acetate, phenolic resins and alkyd resins. One or more of these materials may be used if desired.

In order to more improve the ink receptivity of the ink-receiving layer in the process as described above, at least one of fillers, for example, silica, clay, talc, diatomaceous earth, calcium carbonate, calcium sulfate, barium sulfate, aluminum silicate, synthetic zeolites, alumina, zinc oxide, lithopone, satin white, etc. may be dispersed in the ink-receiving layer within limits not impeding the light transmission properties of the recording medium.

The thus-formed recording medium according to the embodiment (1) is a light-transmitting recording medium having satisfactory light transmission properties.

The term "satisfactory light transmission properties" as used herein means that the linear transmittance of the recording medium is 10% or higher.

If the linear transmittance is 10% or higher, the details of a recorded image can be distinctly observed when the recorded image is projected on a screen by, for example, an OHP.

In the present invention, the linear transmittance T (%) is a value determined in the following manner. Namely, a spectral transmittance of linear light, which has been perpendicularly incident upon a sample, permeated through the sample, passed through a slit situated on the light-receiving side at least 8 cm away from the sample on a line extended from the incident optical path and then entered a detector, is measured, for example, by means of a 323 Type Hitachi Autographic Spectrophotometer (manufactured by Hitachi Ltd.). The Y value of tristimulus values is found from the measured spectral transmittance, thereby calculating the linear transmittance T in accordance with the following equation:

$$T=Y/Y_{\cdot}\times 100 \qquad (1)$$

wherein T is a linear transmittance, Y is the Y value of the sample, and $Y_{\cdot}$ is the Y value of a blank.

Therefore, the linear transmittance referred to in the present invention is concerned with the linear light. This measurement process thus differs from a process in which the light transmission properties is evaluated in terms of diffuse light, such as a diffuse transmittance (an integrating sphere is arranged at the rear of a sample to determine a transmittance including diffuse light) or an opacity (white and black backing are separately applied to the rear side of a sample to determine the opacity from ratios of their reflectances).

The behavior of linear light becomes a problem in instruments making good use of optical techniques, and the like. When evaluating the light transmission properties of a recording medium intended to be used in such an instrument, it is thus particularly important to determine the linear transmittance of the recording medium.

When a projected image is observed by, for example, an OHP, the provision of an image high in contrast between a recorded area and an unrecorded area, bright and easy to read requires that the unrecorded area of the projected image is clear, namely, the linear transmittance of the recording medium is not lower than a certain level. According to a test using a test chart in the OHP, the linear transmittance of the recording medium must be 2% or higher for providing an image which meets the above object, or 10% or higher for providing a brighter image. Therefore, the recording medium which meets this object must have a linear transmittance of at least 10%.

A recording medium according to the preferred embodiment (2) is also one of the recording media according to the embodiment (1) and has a feature that the surface of an ink-receiving layer is smooth. The smooth surface referred to in the present invention means that a surface has a 45° specular gloss of at least 30% in accordance with JIS Z 8741. The recording medium of this type is excellent particularly in surface gloss and particularly useful as a recording medium which is used for the observation of a surface image and provides a full-color image excellent in brightness. The recording medium according to this embodiment may be either transparent or opaque. Therefore, both transparent and opaque base materials as described above may be used in this recording medium. Besides, an ink-receiving layer formed on the base material may also be either transparent or opaque. The materials and process used in the formation of the ink-receiving layer are the same as those used in the embodiment (1). However, the fillers as described above may be used to an extent that the ink-receiving layer becomes opaque so far as the surface of the ink-receiving layer is kept smooth.

As necessary, a cast coating method other than the coating methods described above may be used, and calender rolls may be used to gloss the surface.

In the above embodiments of the present invention, the thickness of the ink-receiving layer formed on the base material is generally of the order of 1 to 100 μm, preferably 3 to 30 μm.

The present invention has been described above taking the cases of the recording media according to the typical embodiments of the present invention. It goes without saying that the recording media according to the present invention are not limited to these embodiments. In both embodiments, it is also possible to contain a variety of the known additives such as a dispersant, fluorescent dye, pH adjustor, antifoaming agent, lubricant, antiseptic and surfactant in the ink-receiving layers.

Incidentally, the recording media according to the present invention are not always colorless, but may be colored.

The present invention will hereinafter be described more specifically by reference to the following Examples. Incidentally, all designations of "part" or "parts" as will be used in the following examples mean part or parts by weight unless expressly noted.

EXAMPLE 1

A polyethylene terephthalate film (product of Toray Industries, Inc.) having a thickness of 100 μm was used as a light-transmitting base material, and coated with a mixed coating formulation composed of Liquid (I) and Liquid (II) having the following respective compositions by an applicator to give a dry coat thickness of 10 μm. The film thus coated was then dried at 100° C. for 10 minutes to obtain a light-transmitting recording medium according to the present invention.

| | |
|---|---|
| Liquid (I): | |
| Polyacrylic acid | 100 parts |
| NaOH | 6 parts |
| Dimethylbenzylamine | 90 parts |
| $H_2O$ | 300 parts |
| MeOH | 100 parts. |
| Liquid (II): | |
| $CH_3-Si-(OC_2H_5)_3$ | 100 parts |
| 2N HCl | 0.3 part |
| $H_2O$ | 50 parts |
| MeOH | 200 parts. |

The thus-obtained recording medium according to the present invention was colorless and transparent. Using the following four inks of different kinds, full-color ink-jet recording was performed on this recording medium by means of an On-Demand type ink-jet recording apparatus (PIXEL JET, trade name, manufactured by Canon Inc.) in which each ink was ejected by the action of thermal energy.

| | |
|---|---|
| Yellow ink (composition): | |
| C.I. Direct Yellow 86 | 2 parts |
| Diethylene glycol | 20 parts |
| Polyethylene glycol #200 | 10 parts |
| Water | 70 parts. |
| Red ink (composition): | |
| C.I Acid Red 35 | 2 parts |
| Diethylene glycol | 20 parts |
| Polyethylene glycol #200 | 10 parts |

-continued

| | |
|---|---|
| Water | 70 parts. |
| Blue ink (composition): | |
| C.I Direct Blue 86 | 2 parts |
| Diethylene glycol | 20 parts |
| Polyethylene glycol #200 | 10 parts |
| Water | 70 parts. |
| Black ink (composition): | |
| C.I Food black 2 | 2 parts |
| Diethylene glycol | 20 parts |
| Polyethylene glycol #200 | 10 parts |
| Water | 70 parts. |

The evaluation results of the recording medium according to this example are shown in Table 1. The measurements of the evaluation items shown in Table 1 were effected in accordance with the following respective methods.

(1) The ink fixing time was determined by measuring the time required until each ink dried and no longer adhered on a finger when the recording medium was allowed to stand at room temperature after completion of the recording, and a recorded image was touched with the finger.

(2) The dot density was determined by measuring the density of a black dot by means of a Sakura Microdensitometer PDM-5 (manufactured by Konishiroku Photo Industry Co., Ltd.) while applying the method of JIS K 7605 to a printing microdot.

(3) The OHP suitability was determined as a typical example of optical instruments and judged by projecting a recorded image on a screen and visually observing a projected image formed. It was ranked as A where the recorded image was high in optical density (OD) and the projected image had a clear unrecorded area and was high in contrast, bright and easy to read, B where the recorded image was somewhat low in OD and the projected image had a somewhat dark unrecorded area and was not clearly distinguishable in lines having a pitch width of 0.5 mm and a thickness of 0.25 mm, or C where the recorded image was considerably low in OD and the projected image had a considerably dark unrecorded area and was not clearly distinguishable in lines having a pitch width of 1 mm and a thickness of 0.3 mm, or the unrecorded area was indistinguishable from a recorded area.

(4) The linear transmittance was determined in accordance with the equation (1) by measuring a spectral transmittance using a 323 Type Hitachi Autographic Spectrophotometer (manufactured by Hitachi Ltd.) in which a distance between a sample and a slit provided on the light-receiving side was kept at about 9 cm.

(5) The gloss was determined by measuring the 45° specular gloss of a surface of the recording medium in accordance with JIS Z 8741.

(6) The resistance to curling was evaluated by projecting the recorded image formed on the recording medium by the full-color recording on a screen by an OHP and ranked as A where the projected image was legible, or C where the projected image blurred and was illegible due to the occurrence of curling.

EXAMPLE 2

A light-transmitting recording medium was obtained in the same manner as in Example 1 except that a mixed coating formulation having the following composition was used in place of the coating formulation used in Example 1.

| Composition of coating formulation: | |
|---|---|
| Liquid (I): | |
| Polyacrylic acid | 100 parts |
| LiOH | 10 parts |
| Benzylamine | 120 parts |
| $H_2O$ | 200 parts |
| MeOH. | 100 parts. |
| Liquid (II): | |
| $Si—(OC_2H_5)_4$ | 50 parts |
| $Si—(OCH_3)_4$ | 50 parts |
| 4N $CH_3COOH$ | 10 parts |
| $H_2O$ | 50 parts |
| MeOH | 200 parts. |

The thus-obtained recording medium according to the present invention was colorless and transparent.

The same ink-jet recording as in Example 1 was also performed on this recording medium, and its recordability was evaluated in the same manner as in Example 1. The results are also given in Table 1.

EXAMPLE 3

A light-transmitting recording medium was obtained in the same manner as in Example 1 except that a mixed coating formulation having the following composition was used in place of the coating formulation used in Example 1.

| Composition of coating formulation: | |
|---|---|
| Liquid (I): | |
| Polyacrylic acid | 100 parts |
| NaOH | 10 parts |
| Benzylamine | 100 parts |
| $H_2O$ | 300 parts |
| MeOH | 100 parts. |
| Liquid (II): | |
| $Si—(OC_2H_5)_4$ | 50 parts |
| $C_6H_5—Si—(OC_2H_5)_3$ | 50 parts |
| 2N HCl | 0.3 part |
| $H_2O$ | 50 parts |
| MeOH | 200 parts. |

The thus-obtained recording medium according to the present invention was colorless and transparent.

The same ink-jet recording as in Example 1 was also performed on this recording medium, and its recordability was evaluated in the same manner as in Example 1. The results are also given in Table 1.

EXAMPLE 4

A light-transmitting recording medium was obtained in the same manner as in Example 1 except that a mixed coating formulation having the following composition was used in place of the coating formulation used in Example 1.

| Composition of coating formulation: | |
|---|---|
| Liquid (I): | |
| Polyacrylic acid | 100 parts |
| LiOH | 10 parts |
| Benzylamine | 120 parts |
| $H_2O$ | 200 parts |
| MeOH | 100 parts. |

-continued

| Composition of coating formulation: | |
|---|---|
| Liquid (II): | |
| $Si—(OC_2H_5)_4$ | 50 parts |
| $CH_3—Si—(OCH_3)_3$ | 50 parts |
| 4N $CH_3COOH$ | 10 parts |
| $H_2O$ | 50 parts |
| MeOH | 200 parts. |

The thus-obtained recording medium according to the present invention was colorless and transparent.

The same ink-jet recording as in Example 1 was also performed on this recording medium, and its recordability was evaluated in the same manner as in Example 1. The results are also given in Table 1.

EXAMPLE 5

Art paper was used as a base material, and coated with a mixed coating formulation composed of Liquid (I) and Liquid (II) having the following respective compositions by a bar coater method to give a dry coat thickness of 10 μm. The paper thus coated was then subjected to a heat treatment at 80° C. for 20 minutes to dry it, thereby obtaining a recording medium according to the present invention.

| Composition of coating formulation: | |
|---|---|
| Liquid (I): | |
| Polyacrylic acid | 100 parts |
| NaOH | 10 parts |
| Dimethylbenzylamine | 100 parts |
| $H_2O$ | 300 parts |
| MeOH | 100 parts. |
| Liquid (II): | |
| $Si—(OC_2H_5)_4$ | 50 parts |
| $C_6H_5—Si—(OCH_3)_3$ | 50 parts |
| 2N HCl | 0.3 part |
| $H_2O$ | 50 parts |
| MeOH | 200 parts. |

The thus-obtained recording medium according to the present invention had a high gloss.

The same ink-jet recording as in Example 1 was also performed on this recording medium, and its recordability was evaluated in the same manner as in Example 1. The results are also given in Table 1.

EXAMPLE 6

A recording medium was obtained in the same manner as in Example 5 except that a mixed coating formulation having the following composition was used in place of the coating formulation used in Example 5.

| Composition of coating formulation: | |
|---|---|
| Liquid (I) | |
| Polymethacrylic acid | 100 parts |
| LiOH | 10 parts |
| Dimethylbenzylamine | 110 parts |
| $H_2O$ | 300 parts |
| MeOH | 100 parts. |
| $Si—(OC_2H_5)_4$ | 50 parts |
| $CH_3—Si—(OC_2H_5)_3$ | 30 parts |
| $C_6H_5—Si—(OCH_3)_3$ | 20 parts |
| 2N HCl | 0.3 part |
| $H_2O$ | 50 parts |
| MeOH | 200 parts. |

The thus-obtained recording medium according to the present invention had a high gloss.

The same ink-jet recording as in Example 1 was also performed on this recording medium, and its recordability was evaluated in the same manner as in Example 1. The results are also given in Table 1.

Comparative Example 1

The same polyester film as that used in Example 1 was used by itself as a recording medium to perform the same ink-jet recording as in Example 1. The recordability of this recording medium was evaluated in the same manner as in Example 1. The results are also given in Table 1.

Comparative Example 2

The same art paper as that used in Example 5 was used as a recording medium as it is to perform the same ink-jet recording as in Example 1. The recordability of this recording medium was evaluated in the same manner as in Example 1. The results are also given in Table 1

Comparative Example 3

A polyethylene terephthalate film (product of ICI Ltd.) having a thickness of 100 μm was used as a light-transmitting base material, and coated with a coating formulation having the following composition by a blade coater method to give a dry coat thickness of 10 μm. The film thus coated was then subjected to a heat treatment at 80° C. for 10 minutes to dry it, thereby obtaining a recording medium.

| Composition of coating formulation: | |
|---|---|
| Gelatin | 10 parts |
| Water | 90 parts. |

The same ink-jet recording as in Example 1 was also performed on the thus-obtained recording medium, and its recordability was evaluated in the same manner as in Example 1. The results are also given in Table 1.

TABLE 1

| | Example | | | | | | Comp. Example | | |
|---|---|---|---|---|---|---|---|---|---|
| | 1 | 2 | 3 | 4 | 5 | 6 | 1 | 2 | 3 |
| Ink fixing time (min) | 1.5 | 3 | 1.5 | 2 | 1.5 | 1 | 7 days | 5 | 30 |
| Dot density | 1.2 | 1.0 | 1.3 | 1.3 | 1.3 | 1.5 | 1.0 | 0.5 | 1.0 |

TABLE 1-continued

| | Example | | | | | | Comp. Example | | |
|---|---|---|---|---|---|---|---|---|---|
| | 1 | 2 | 3 | 4 | 5 | 6 | 1 | 2 | 3 |
| OHP suitability | A | A | A | A | — | — | A | — | A |
| Linear transmittance (%) | 83 | 81 | 84 | 84 | — | — | 80 | — | 72 |
| Gloss (%) | — | — | — | — | 48 | 50 | — | 38 | — |
| Resistance to curling | A | A | A | A | — | — | A | — | C |
| Overall evaluation | A | A | A | A | A | A | C | C | C |

Overall evaluation A: Good, C: Poor.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A recording medium comprising a base material and an ink-receiving layer provided on the base material, wherein the ink-receiving layer comprises a water-absorptive material obtained by grafting, on a water-absorptive polymer an ultrafine particle of, an inorganic oxide formed from an inorganic alkoxide represented by the formula $$(R_2)_n—M—(OR_1)_{m-n}$$

wherein M denotes an element selected from the group consisting of Si, Al, Ti, Zr, Ca, Fe, V, Sn, Be, B and P, m is a valence of M, n is an integer of 1 or 2, $R_1$ denotes an alkyl group having 1 to 4 carbon atoms, and $R_2$ denotes an alkyl group having 1 to 4 carbon atoms or a phenyl group.

2. A recording medium comprising a base material and an ink-receiving layer provided on the base material, wherein the ink-receiving layer comprises a water-absorptive material obtained by grafting, on a water-absorptive polymer an ultrafine particle of, at least two inorganic oxides formed from inorganic alkoxides represented by the formula $$(R_2)_n—M—(OR_1)m-n$$

wherein M denotes an element selected from the group consisting of Si, Al, Ti, Zr, Ca, Fe, V, Sn, Li, Be, B and P, m is a valence of M, n is an integer of 0, 1 or 2, $R_1$ denotes an alkyl group, and $R_2$ denotes an alkyl group or a phenyl group.

3. The recording medium according to claim 1 or 2, wherein the water-absorptive polymer comprises at least a polyacrylic acid and a neutralized salt of the polyacrylic acid.

4. The recording medium according to claim 3, wherein the neutralized salt of the polyacrylic acid is a salt with at least one of lithium, sodium, potassium and amine compounds.

5. The recording medium according to claim 1 or 2, wherein the linear transmittance of the recording medium is at least 10%.

6. The recording medium according to claim 1 or 2, wherein the surface gloss of the recording medium is at least 30%.

7. A print obtained by printing images on the ink-receiving layer of the recording medium according to claim 1 or 2.

8. The recording medium according to claim 1, wherein the inorganic alkoxide is selected from the group consisting of $CH_3Si(OCH_3)_3$, $CH_3Si(OC_2H_5)_3$, $C_6H_5Si(OCH_3)_3$, $C_6H_5Si(OC_2H_5)_3$ and $(CH_3)_2Si(OCH_3)_2$.

9. The recording medium according to claim 2, wherein the inorganic alkoxide is selected from the group consisting of $CH_3Si(OCH_3)_3$, $CH_3Si(OC_2H_5)_3$, $C_6H_5Si(OCH_3)_3$, $C_6H_5Si(OC_2H_5)_3$, $(CH_3)_2Si(OCH_3)_2$, $Si(OCH_3)_4$ and $Si(OC_2H_5)_4$.

* * * * *

UNITED STATES PATENT AND TRADEMARK OFFICE

CERTIFICATE OF CORRECTION

PATENT NO. : 5,607,751

DATED : March 4, 1997

INVENTOR(S) : TEIGO SAKAKIBARA, ET AL.

It is certified that error appears in the above-identified patent and that said Letters Patent is hereby corrected as shown below:

At [54] TITLE

Line 2, "FORMIMG" should read --FORMING-.

Column 1

Line 2, "FORMIMG" should read --FORMING--.

Column 2

Line 1, "far" should be deleted.

Column 4

Line 6, "far" should be deleted.

Column 5

Line 46, "the" (second occurrence) should be deleted.
Line 48, "the" should be deleted.

UNITED STATES PATENT AND TRADEMARK OFFICE

CERTIFICATE OF CORRECTION

PATENT NO. : 5,607,751
DATED : March 4, 1997
INVENTOR(S) : TEIGO SAKAKIBARA, ET AL.

It is certified that error appears in the above-identified patent and that said Letters Patent is hereby corrected as shown below:

Column 6

Line 10, "far" should be deleted.
Line 33, "process" should read --process in which--.
Line 35, "material" should read --material,--.

Column 7

Line 22, "is" should read --are--.

Column 8

Line 35, "invention." should read --invention.
¶ Composition of coating formulation:--
Line 53, "On-Demand" should read --on-demand--.

Column 12

Line 9, "MeOH $Si-(OC_2H_5)_4$ " should read --MeOH Liquid (II): $Si-(OC_2H_5)_4$ --

UNITED STATES PATENT AND TRADEMARK OFFICE

CERTIFICATE OF CORRECTION

PATENT NO. : 5,607,751 Page 3 of 3

DATED : March 4, 1997

INVENTOR(S) : TEIGO SAKAKIBARA, ET AL.

It is certified that error appears in the above-identified patent and that said Letters Patent is hereby corrected as shown below:

Column 13

Line 28, "polymer" should read --polymer,--.
Line 29, "of," should read --of--.
Line 42, "polymer" should read --polymer,--.
Line 43, "of," should read --of--.

Signed and Sealed this

Second Day of December, 1997

Attest:

BRUCE LEHMAN

*Attesting Officer* *Commissioner of Patents and Trademarks*